United States Patent
Kees et al.

(10) Patent No.: US 9,422,906 B2
(45) Date of Patent: Aug. 23, 2016

(54) APPARATUS AND METHOD FOR STARTING AN ENGINE

(71) Applicant: FORD GLOBAL TECHNOLOGIES, LLC, Dearborn, MI (US)

(72) Inventors: Donatus Andreas Josephine Kees, Billericay (GB); Anthemios Philemon Petridis, Bishop's Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/620,976

(22) Filed: Feb. 12, 2015

(65) Prior Publication Data
US 2015/0226171 A1     Aug. 13, 2015

(30) Foreign Application Priority Data

Feb. 12, 2014 (GB) .................................... 1401158.9
Oct. 10, 2014 (GB) .................................... 1417956.8

(51) Int. Cl.
*F02N 11/06* (2006.01)
*F02N 11/00* (2006.01)
*B60W 30/194* (2012.01)
(Continued)

(52) U.S. Cl.
CPC ............. *F02N 11/006* (2013.01); *B60K 6/485* (2013.01); *B60W 10/06* (2013.01); *B60W 10/08* (2013.01); *B60W 10/26* (2013.01); *B60W 20/1082* (2013.01); *B60W 20/16* (2016.01); *B60W 30/194* (2013.01); *F02N 11/04* (2013.01); *F02N 11/0814* (2013.01); *F02N 11/0859* (2013.01); *F02N 11/0862* (2013.01); *B60K 6/00* (2013.01); *B60R 16/02* (2013.01); *B60W 30/00* (2013.01); *B60W 2510/068* (2013.01); *B60W 2510/0676* (2013.01); *B60W 2510/244* (2013.01); *B60W 2710/0694* (2013.01); *F02N 11/00* (2013.01); *F02N 11/0818* (2013.01); *F02N 11/0829* (2013.01); *F02N 11/0866* (2013.01); *F02N 15/08* (2013.01); *F02N 2011/0888* (2013.01); *F02N 2200/023* (2013.01); *F02N 2200/024* (2013.01); *F02N 2200/041* (2013.01); *F02N 2200/046* (2013.01); *F02N 2200/061* (2013.01);
(Continued)

(58) Field of Classification Search
CPC ........................................................ F02N 11/06
USPC .............................................. 701/22; 290/22
See application file for complete search history.

(56) References Cited

U.S. PATENT DOCUMENTS 5,379,740 A     1/1995   Moore et al.
5,934,395 A *  8/1999   Koide ..................... B60K 6/40
                                                     180/65.235
(Continued)

FOREIGN PATENT DOCUMENTS

EP        0989300 A2    3/2000
EP        1369285 A1   10/2003
(Continued)

*Primary Examiner* — Joseph Waks
(74) *Attorney, Agent, or Firm* — David B. Kelley; Brooks Kushman P.C.

(57) ABSTRACT

An apparatus for starting an engine of a mild hybrid vehicle is disclosed having low and high voltage starting devices and controlled by an electronic controller. The electronic controller is operable to use the high voltage starting device as a motor to crank the engine whenever possible so as to partially discharge a high voltage battery and facilitate the increased use of automatic stopping and starting of the engine.

12 Claims, 2 Drawing Sheets

(51) Int. Cl.
*B60W 20/00* (2016.01)
*F02N 11/04* (2006.01)
*B60W 10/06* (2006.01)
*B60W 10/08* (2006.01)
*B60W 10/26* (2006.01)
*B60K 6/485* (2007.10)
*B60K 6/00* (2006.01)
*B60R 16/02* (2006.01)
*B60W 30/00* (2006.01)
*F02N 11/08* (2006.01)
*F02N 15/08* (2006.01)

(52) U.S. Cl.
CPC .. *F02N2200/122* (2013.01); *F02N 2300/2002* (2013.01); *Y02T 10/6226* (2013.01); *Y10S 903/93* (2013.01)

(56) References Cited

U.S. PATENT DOCUMENTS

| | | | | |
|---|---|---|---|---|
| 8,763,578 | B2* | 7/2014 | Poeltenstein | B60K 6/48 123/179.28 |
| 2002/0121256 | A1* | 9/2002 | Warren | F01L 1/34 123/179.3 |
| 2008/0077308 | A1* | 3/2008 | Laubender | F02N 11/08 701/113 |
| 2009/0043437 | A1 | 2/2009 | Shiino | |
| 2012/0316715 | A1 | 12/2012 | Suzuki | |
| 2013/0038271 | A1 | 2/2013 | Park | |
| 2013/0066492 | A1 | 3/2013 | Holmes et al. | |
| 2013/0260957 | A1 | 10/2013 | Ueda et al. | |
| 2013/0291830 | A1* | 11/2013 | Doering | F02D 41/023 123/350 |
| 2013/0296126 | A1* | 11/2013 | Gibson | F02N 11/006 477/5 |
| 2015/0096518 | A1* | 4/2015 | Creviston | F02N 11/04 123/179.4 |
| 2016/0031434 | A1* | 2/2016 | Thompson | B60W 10/02 701/22 |

FOREIGN PATENT DOCUMENTS

GB 2486708 A 6/2012
JP 2000282909 A * 10/2000

* cited by examiner

APPARATUS AND METHOD FOR STARTING AN ENGINE

CROSS-REFERENCE TO RELATED APPLICATIONS

This application claims foreign priority benefits under 35 U.S.C. §119(a)-(d) to GB 1401158.9, filed Feb. 12, 2014, and GB 1417956.8, filed Oct. 10, 2014, which are hereby incorporated by reference in their entirety.

TECHNICAL FIELD

This disclosure relates to internal combustion engines, and in particular to an apparatus and method for starting such engines.

BACKGROUND

It is well known to use a low voltage (12 volt) starter motor to start an internal combustion engine even when the engine is at a very low temperature such as for example minus 30° C. It is further known to provide an engine with a high voltage (for example 48 volt) belt integrated starter generator (BISG) that is driveably connected to a crankshaft of the engine by a drive belt and is able to be either driven by the engine to generate electrical power or drive the engine either to assist with power output or for starting the engine.

Normally the BISG is only used when the temperature of the engine is above a relatively warm temperature corresponding to a low end of a temperature range of normal engine operation such as for example 60° C. because a conventional BISG will normally have insufficient torque to start the engine at lower temperatures.

It is further known that the fuel saving ability of a vehicle is restricted or limited by the need to first light-off any exhaust aftertreatment devices. It is therefore desirable, particularly when the engine is cold, to apply a load to the engine after it has started in order to increase the temperature of the exhaust gas and thereby reduce the time taken to light-off any attached exhaust aftertreatment devices.

The BISG can be usefully employed to apply such a heating load but is often not able to do so because the current state of charge (SOC) of the associated high voltage battery will not permit the BISG to be run as a generator.

One advantage of using the BISG over a larger temperature range to start the engine is therefore that the discharging effect of using the BISG to start the engine can beneficially be used to reduce the state of charge of the high voltage battery thereby allowing the BISG to be subsequently operated as a generator after the engine has started to apply a load to the engine and speed up light-off of the exhaust aftertreatment devices.

A further advantage of using the BISG over a larger temperature range to start the engine in the case of a mild hybrid vehicle is that stop-start operation does not have to be restricted until the engine temperature has reached the low end of the temperature range of normal engine operation (60 to 120° C.) but can be used whenever BISG starting is possible thereby increasing the opportunities for stop-start operation.

Therefore it is desirable to use the BISG whenever possible to start the engine.

GB Patent application 2,486,708 discloses a method and system in which a temperature limit is used to determine whether to use the BISG to start the engine. The temperature limit being set primarily on whether the NVH performance of the motor vehicle will be adversely affected by use of the BISG to start the engine compared to the use of a starter motor. However, the temperature limit is set relatively high because it is possible to breach this limit when queuing in traffic in cold ambient conditions.

SUMMARY

There is provided an apparatus for starting an engine of a motor vehicle comprising a high voltage belt integrated starter-generator, a low voltage starter motor and an electronic controller to control the operation of at least the high voltage belt integrated starter-generator and the low voltage starter motor wherein the electronic controller is operable to use the low voltage starter motor to crank the engine if the temperature of the engine is below a predefined low temperature limit set well below a normal operating temperature of the engine and to otherwise use the high voltage belt integrated starter-generator to crank the engine provided the high voltage belt integrated starter-generator is able to effectively crank the engine.

The high voltage belt integrated starter generator may be able to effectively crank the engine if it is able to crank the engine at a speed greater than a defined rotational speed.

Alternatively the high voltage belt integrated starter generator may be able to effectively crank the engine if it is able to produce an acceleration of the engine greater than a defined acceleration.

The low temperature limit may be a temperature falling within the range of minus 30 to plus 5 degrees Celsius.

The high voltage belt integrated starter-generator may not be able to effectively crank the engine if the state of charge of a battery used to power the high voltage belt integrated starter-generator before cranking commences is below a predefined level.

There is provided a mild hybrid motor vehicle having an engine and an apparatus to start the engine.

Automatic stopping and starting of the engine may be permitted provided the temperature of the engine is above the predefined low temperature limit.

There is provided a method of starting an engine of a motor vehicle using one of a high voltage belt integrated starter-generator and a low voltage starter motor wherein the method comprises using the low voltage starter motor to crank the engine if the temperature of the engine is below a predefined low temperature limit set well below a normal operating temperature of the engine and to otherwise use the high voltage belt integrated starter-generator to crank the engine, provided the high voltage belt integrated starter-generator is able to effectively crank the engine.

The high voltage belt integrated starter generator may be able to effectively crank the engine if it is able to crank the engine at a speed greater than a defined rotational speed.

Alternatively, the high voltage belt integrated starter generator may be able to effectively crank the engine if it is able to produce an acceleration of the engine greater than a defined acceleration.

The low temperature limit may be a temperature falling within the range of minus 30 to plus 5 degrees Celsius.

The high voltage belt integrated starter-generator may not be able to effectively crank the engine if the state of charge of a battery used to power the high voltage belt integrated starter-generator before cranking commences is below a predefined level.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
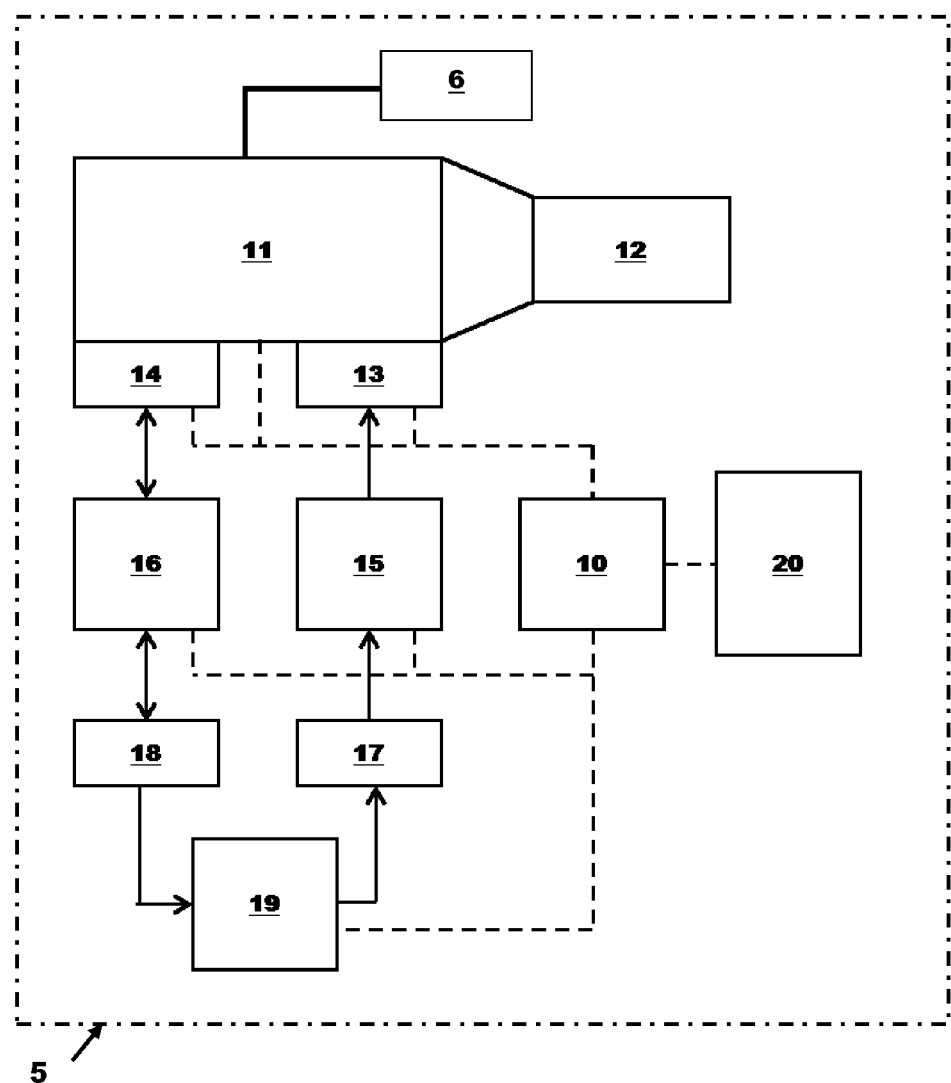
FIG. 1 is a block diagram of an engine system including an apparatus for starting the engine.

With reference to FIG. 1 there is shown a mild hybrid vehicle 5 having an engine system including an engine 11 drivingly connected to a gearbox 12 and an apparatus for starting the engine 11. One or more exhaust gas aftertreatment devices 6 are arranged to receive exhaust gas from the engine 11.

The apparatus for starting the engine 11 comprises an electronic controller in the form of a control unit 10, a low voltage starter system including a starter motor 13, a low voltage battery 17 and a low voltage battery management system 15 and a high voltage starter system including a belt integrated starter-generator 14, a high voltage battery 18 and a high voltage battery management system 16.

The apparatus for starting the engine 11 further comprises a DC to DC voltage converter for selectively connecting the high voltage battery 18 to the low voltage battery 17 for the purpose of recharging the low voltage battery 17 and a number of inputs 20 for providing information to the electronic controller 10.

A 'mild hybrid vehicle' is a vehicle having an electric motor/generator (starter-generator) driveably connected to an engine of the vehicle to
a/ assist the engine of the vehicle by producing mechanical torque using electricity stored in a high voltage battery (torque assist);
b/ capture energy from the vehicle with no fuel penalty;
c/ store captured energy as electricity in the high voltage battery;
d/ start the combustion engine of the vehicle; and
e/ provide electrical energy to users of the vehicle.
Such vehicles are sometimes alternatively referred to as 'micro-hybrid vehicles'.

The electric motor is not used on its own in a mild hybrid vehicle to drive the vehicle it is only used to start the engine or assist the engine in driving the vehicle so as to reduce the instantaneous fuel consumption of the engine.

Therefore the BISG 14 can operate in two modes, in the first mode it is driven by the engine 11 to produce electrical power for storage in the high voltage battery 18 (HV battery) and in the second mode is produces torque to either supplement the torque produced by the engine 11 or for use in starting the engine 11.

The electronic controller is described in this case as being a single control unit 10 operable to control not only the general operation of the engine 11 but also the low and high voltage starter systems. It will however be appreciated that the electronic controller could comprise of a number of interlinked electronic controllers providing in combination the same functionality.

In the case of the example shown in FIG. 1 the inputs to the electronic controller 10 include at least one input from which the temperature of the engine 11 can be deduced and in this case comprise sensor inputs indicative of ambient air temperature; intake air temperature; coolant temperature; cylinder head temperature and engine cylinder block temperature and at least one input indicative of engine speed and/or BISG speed.

The high voltage battery 18 of the high voltage starter system is operatively connected via the DC to DC converter 19 to the battery 17 of the low voltage starter system so that the low voltage battery can be recharged by the BISG 14 when required.

The electronic controller 10 is operatively connected to the DC to DC converter 19, to the high and low voltage battery management systems 16 and 15, the starter motor 13 and BISG 14 and various other devices and sensors associated with the engine 11.

The electronic controller 10 also includes an engine stop-start controller for the motor vehicle 5 and the inputs 20 also include inputs for use in determining when the engine 11 should be automatically stopped in order to save fuel. Such a stop is referred to herein as an 'E-stop' because its function is to increase the economy of the engine 11. As is well known in the art various triggers can be used to initiate an E-stop based upon operation of various driver actions and further triggers based upon driver actions can be used to initiate an automatic restart following an E-stop. Any suitable combination of stop and start triggers can be used. An automatic engine stop or E-stop is one where the engine 11 is temporarily stopped to save fuel and reduce emissions by the electronic controller 10 in response to one or more conditions based upon driver actions.

In the case of the example being described low voltage' is a voltage of circa 12 volts and 'high voltage' is a voltage of circa 48 volts. It will however be appreciated that all embodiments are not limited to these voltages although they are advantageous in that equipment utilizing such voltages is readily available.

Operation of the apparatus for starting the engine 11 is as follows.

When the controller 10 receives an input indicative that the engine 11 is to be started it has to decide whether to use the starter motor 13 to perform the start or the BISG 14. The input indicative that the engine is required to be started could be a manual one resulting from a driver actuation of a starting input device such as a start button or ignition key or can be produced automatically at the end of an E-stop.

The default condition for the electronic controller 10 is to use the BISG 14 to start the engine 11 because this will result in a higher start quality and also has the effect of almost instantaneously reducing the state of charge (SOC) of the high voltage battery 18 due to the high current draw required to start the engine 11. Reducing the SOC of the high voltage battery 18 is particularly advantageous if the engine 11 is not up to temperature because it is then desirable to light-off any exhaust aftertreatment devices as soon as possible in order to reduce exhaust emissions and permit the engine control strategy to be more focussed on CO2 reduction.

By using the BISG 14 to start the engine 11 it is ensured that immediately after the engine 11 has started the BISG 14 can be switched to the first or charging mode to recharge the high voltage battery 18 thereby applying an additional load to the engine 11 which speeds up light-off of any exhaust aftertreatment devices by increasing the temperature of the exhaust gas exiting the engine 11 (exhaust gas heating).

There are several situations where the starter motor 13 is used to start the engine 11 instead of the BISG 14.

The first of these is when the engine 11 is sensed to be at a very low temperature well below the low end of a normal range of operation such as, for example and without limitation, a temperature close to 0° C. At low temperatures the torque required to start the engine 11 increases dramatically, particularly if ice crystals form within the engine 11. Therefore, if the engine temperature is below a minimum temperature ($T_{min}$), the starter motor 13 is used to start the engine 11. It will be appreciated that a starter motor 13 is geared so as to produce a large output torque but can only rotate the engine at a relatively low speed. Typically a maximum cranking speed produced by a starter motor will be circa 400 RPM.

The minimum temperature $T_{min}$ may be derived from experimental work for each engine/BISG combination but in all cases is the temperature below which the torque available from the BISG 14 is unlikely to be sufficient to produce a clean or good quality start. It will be appreciated that there is a compromise between increasing the torque output capacity of the BISG 14 versus its general operating efficiency and that, at low temperatures, other factors such as drive belt efficiency and durability have to be taken into account. However, the inventors have realized that, in the case of a mild hybrid motor vehicle where the BISG is also used to provide torque assist to the engine, the torques capacity of the BISG is normally greater than is the case with a conventional motor vehicle. Therefore the BISG is able to crank the engine at lower temperatures than were formerly considered to be possible. In addition with the increasing use of small capacity turbocharged petrol engines often operating with lower compression ratios the opportunities for use of a BISG to start such an engine is greatly increased.

The temperature below which starting of an engine is possible will depend upon the size and type of the engine and the torque capacity of the BISG. For example in the case of a small petrol engine it may be possible to use the BISG to produce a clean engine start down to minus 30° C. ($T_{min}=-30°$ C.) whereas, in the case of a large diesel engine or large petrol engine, the BISG may not be able to cleanly start the engine below plus 5° C. ($T_{min}=+5°$ C.). Therefore $T_{min}$ is generally within the range of −30° C. to +5° C.

A second situation where the starter motor 13 is used instead of the BISG 14 is when the cranking speed or acceleration of the engine 11 produced by the BISG 14 is unacceptably low.

In its most simplistic form engine speed can be checked by using a comparison of the current cranking speed Nc with a defined speed limit $Nc_{min}$ and if the current measure of cranking speed Nc is below the value set for $Nc_{min}$ reverting to the starter motor 13 to start the engine 11. For example by checking the speed of the engine 11 a predefined period of time after cranking has commenced with an expected engine speed it can be determined if the BISG 14 is able to effectively crank the engine 11. The value of $Nc_{min}$ can be a variable based upon temperature and/or time since cranking commenced in which case a look up chart or table referencing time/temperature and engine speed could be used to check the predicted ability of the BISG 14 to start the engine 11.

A similar approach could be used if the test is based upon engine acceleration. The engine speed in this case being used to produce a value of engine acceleration which is compared to a predefined or expected rate of acceleration if the BISG is functioning normally and would be expected to produce a good quality start. As before the expected rate of acceleration could be varied based upon engine temperature and a look up chart or table referencing temperature and engine acceleration could be used to check the predicted ability of the BISG 14 to start the engine 11.

There are various reasons why the cranking speed or rate of engine acceleration could be unacceptably low, for example and without limitation, the resistance to cranking of the engine 11 could be higher than expected, the SOC of the high voltage battery 18 could be low, there could be a fault in the BISG 14, there could be insufficient torque transfer capacity due to drive belt slip or the high voltage battery management system 16 could block the drawing of current from the high voltage battery because the SOC of the high voltage battery is at or below a lower limit.

Therefore whenever cranking using the BISG 14 is determined to be unavailable or ineffective the electronic controller 10 is operable to use the starter motor 13 to start the engine 11 even if the temperature is above the low temperature limit.

It will be appreciated that if a test for efficient starting is used then the value set for the temperature limit can in some cases be set lower than would otherwise be the case because the efficient cranking test effectively acts as a safety net for the temperature test.

A third situation where the starter motor 13 is used instead of the BISG 14 is when the state of charge of a battery used to power the high voltage BISG 14 is below a predefined level before cranking commences. It will be appreciated that there has to be a certain level of charge in the high voltage battery 18 for it to be able to successfully power the BISG 14 during an engine start. In addition this predefined level of charge will vary depending upon the expected torque required to start the engine 11. Therefore, if the state of charge of the high voltage battery 18 is below the predefined level for the current temperature, it is likely that the BISG 14 will not be able to effectively crank the engine 11 and so the starter motor 13 is used to start the engine 11. It will also be appreciated that with most battery construction there is a low SOC limit below which if the battery is discharged below damage to the battery or loss of battery performance will result.

For example and without limitation, if the low SOC limit is 10% of total HV battery capacity and the expected drain on the HV battery 18 required to start the engine is 40% of total capacity then, if the SOC of the HV battery 18 is less than 50%, use of the starter motor 13 would be required to prevent the low SOC limit being breached.

It will be appreciated that the function of the high and low voltage battery management systems 16 and 15 is to monitor and control the state of charge of the respective battery 18 and 17 to which they are connected and to prevent over discharging or excessive charging of these batteries 18, 17.

Figure 2:
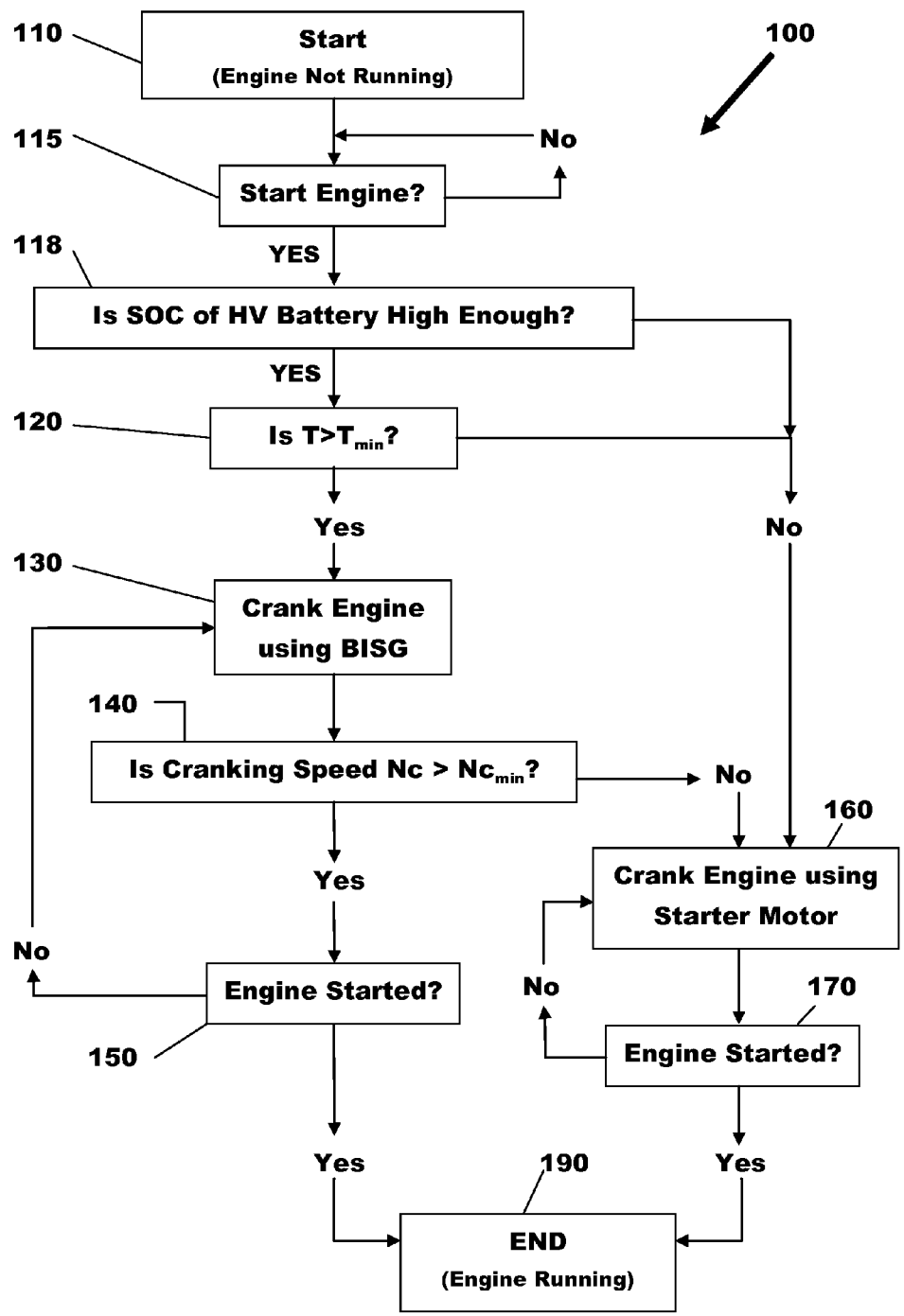
FIG. 2 is a flow chart of a method for starting an engine.

With reference to FIG. 2 there is shown a high level flowchart of a method 100 for starting the engine 11 that could be embodied as software or firmware as part of the electronic controller 10.

The method starts in box 110 with a key-on event and with the engine 11 not running, and then advances to box 115 to check whether an engine start request has been received either due to a manual start operation by a user of the engine 11 or due to an automatic start request at the end of an E-stop.

If no start request has been received the method cycles through box 115 until either a key-off event occurs or an engine start request is received.

If a key-off event occurs, the method terminates with the engine 11 still not running and, if an engine start request is received, the method advances to box 118.

In box 118 it is checked whether there is sufficient charge in the high voltage battery 18 to effectively start the engine using the BISG 14 or the low SOC limit would be breached by such use, if there is not sufficient charge or the low SOC limit would be breached, the method advances to box 160 to start the engine 11 using the starter motor 13 and, if there is sufficient charge in the high voltage battery 18 and the low SOC limit will not be breached, the method continues to box 120.

In box 120 it is checked whether a current engine temperature (T) is above a minimum temperature limit ($T_{min}$). As previously discussed this temperature limit is a positive temperature within a few degrees of zero degrees Celsius or a negative temperature of up to about minus 20 degrees Celsius. The temperature used for this test could be the temperature of part of the engine 11 such as a cylinder block or cylinder head or the temperature of the engine coolant depending upon the specific arrangement of the engine system and sensors. In one example, the temperature limit was set at 0° C. and the measured temperature was a measurement of cylinder block temperature.

As previously mentioned the temperature limit ($T_{min}$) normally falls within the range of −30 to +5 degrees Celsius depending upon various factors.

If the current temperature is above the minimum temperature limit $T_{min}$ then the method advances to box 130 otherwise it advances to box 160.

In box 130 the engine 11 is cranked using the BISG 14 and the resulting cranking speed (Nc) is measured using a rotational speed sensor. Then in box 140 it is checked whether the cranking speed is above a speed limit $Nc_{lim}$ chosen to represent a speed where a good quality engine start will be produced if the BISG 14 is operating correctly. The speed is not necessarily the final speed expected to be reached by the engine 11 when cranked by the BISG 14 it could be a speed expected to be attained by the engine a predetermined period of time after initiation of cranking. This test is used to confirm that the BISG 14 is operating correctly and is capable of producing a high quality engine start. As previously referred to, this test could be replaced by an engine acceleration test. In which case the test would be replaced in box 140 with:—

Is the measured engine acceleration greater than a required rate of engine acceleration?

It will be appreciated that the logic used could be reversed so that the test could check whether the engine speed or engine acceleration is less than a defined value and in which case the Values of "Yes" and "No" would need to be reversed.

However, as shown, if Nc is greater than $Nc_{lim}$ then the method advances to box 150 otherwise it advances to box 160.

In box 150 it is checked whether the engine 11 has started. This check could be performed by measuring the rotational speed of the engine or by any other means such as for example measuring fuel usage or monitoring exhaust gas constituents.

If the engine 11 has started when checked in box 150 the engine start method advances to box 190 with the engine running otherwise it returns from box 150 to box 130 to continue cranking the engine 11 using the BISG 14 and cycles through boxes 130 to 150 until the engine 11 has started.

A further step may be included in the return from box 150 to box 130 to check that the current SOC of the high voltage battery 18 is still above the predefined low SOC limit and, if it is not, starting of the engine 11 using the BISG 14 will need to be aborted.

Referring now back to boxes 120 and 140, if these tests are failed the method advances in both cases to box 160 where the engine 11 is cranked using the starter motor 13 and then advances to box 170 to check whether the engine 11 has started. If the engine has not started the method cycles through boxes 160 and 170 until it does start and when it does start advances to box 190 where the engine start method ends with the engine 11 running.

It will be appreciated that the method 100 will be ended at any step if a key-off event occurs. It will also be appreciated that, if the engine has not started within a predefined period of time following initiation of cranking, further steps (not shown) may be provided to halt cranking of the engine to prevent damaging either the starter motor 13 or the BISG 14 depending upon which starting device is being used.

Provided the temperature of the engine 11 is above the temperature limit ($T_{min}$) then automatic stopping and starting of the engine 11 can be permitted. That is to say an E-stop is permitted provided the temperature of the engine 11 is above $T_{min}$. This greatly increases the opportunities for stop-start operation because conventionally E-stops are only permitted when an engine is operating above the lower end of its normal operating range that is to say above 60° C. Therefore by using a method and apparatus constructed as described, there is scope for considerable reductions in fuel consumption and exhaust emissions due to the increased availability of E-stopping.

Therefore in summary the belt integrated starter-generator is preferably used to start the engine because this will result in a discharging of the associated high voltage battery which can then be rapidly recharged following an engine start to aid with heating of the exhaust gasses and reduce the time required for any exhaust aftertreatment device to reach their respective light-off temperatures. The starter motor is only used if the BISG is not capable of producing an effective start or the temperature is so low that use of the BISG is not possible.

That is to say, if the temperature of the engine is above a temperature very close to zero degrees C. (frost limit), starting of the engine using the BISG is used as this ensures that the BISG can if required immediately following the start be used to assist with exhaust gas heating.

Some advantages may include a/ Conducting an engine start using the 48V BISG, consumes energy from the 48V battery and then immediately after cranking ends the 48V BISG can be used to re-charge the 48V battery and so load the engine. This engine loading will generate more exhaust heat during a cold start period following start-up and will result in faster exhaust gas aftertreatment light-off than would otherwise be possible;

b/ The faster light-off will result in lower engine emissions which will allow the use of a Mild Hybrid control strategy that is more focussed on CO2 reduction without exceeding emission targets for the engine;

c/ When compared to the cranking attributes of a 12V starter, the driver in the vast majority of cases will get a higher start quality for the first engine start due to the use of the 48V BISG. The 12V starter is therefore only used when the ambient temperature is low such as less than about 4° C. or 48V BISG system is unable to crank effectively;

d/ Using the BISG to start the engine produces a better quality start in terms of noise and vibration than a starter motor and less mechanical wear in terms of the components required to effect the start; and e/ Providing a larger range of operation for the BISG increases the possibilities for stop-start operation. That is to say, E-stop can be performed even if the engine has not reached it normal operating temperature range.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for starting an engine of a vehicle comprising:
   a belt integrated starter-generator (BISG);
   a starter motor; and
   an electronic controller operable to use the starter motor to crank the engine if engine temperature is less than a predefined temperature limit and to otherwise use the BISG to crank the engine provided the BISG is operable to crank the engine at a speed greater than a defined rotational speed.

2. An apparatus as claimed in claim 1, wherein the predefined temperature limit falls within a range of −30 to +5 degrees Celsius.

3. An apparatus as claimed in claim 1, wherein the electronic controller is further operable to otherwise use the BISG to crank the engine provided a state of charge of a battery used to power the BISG is greater than a predefined level.

4. An apparatus as claimed in claim 1, wherein the electronic controller is further operable to permit automatic stopping and starting of the engine provided the engine temperature is greater than the predefined temperature limit.

5. An apparatus for starting an engine of a vehicle comprising:
   a belt integrated starter-generator (BISG);
   a starter motor; and
   an electronic controller operable to use the starter motor to crank the engine if engine temperature is less than a predefined temperature limit and to otherwise use the BISG to crank the engine provided the BISG is operable to cause an acceleration of the engine greater than a predefined acceleration.

6. An apparatus as claimed in claim 5, wherein the predefined temperature limit falls within a range of −30 to +5 degrees Celsius.

7. An apparatus as claimed in claim 5, wherein the electronic controller is further operable to otherwise use the BISG to crank the engine provided a state of charge of a battery used to power the BISG is greater than a predefined level.

8. An apparatus as claimed in claim 5, wherein the electronic controller is further operable to permit automatic stopping and starting of the engine provided the engine temperature is greater than the predefined temperature limit.

9. A method of starting an engine of a vehicle comprising:
   using a starter motor to crank the engine if engine temperature is less than a predefined temperature limit, and otherwise using a belt integrated starter-generator (BISG) to crank the engine provided the BISG is operable to crank the engine at a speed greater than a predefined rotational speed.

10. A method as claimed in claim 9, wherein the predefined temperature limit falls within a range of −30 to +5 degrees Celsius.

11. A method as claimed in claim 9 further comprising otherwise using the BISG to crank the engine provided a state of charge of a battery used to power the BISG is greater than a predefined level.

12. A method as claimed in claim 9 further comprising permitting automatic stopping and starting of the engine provided the engine temperature is greater than the predefined temperature limit.

\* \* \* \* \*